US008550670B2

(12) United States Patent
Boyer et al.

(10) Patent No.: US 8,550,670 B2
(45) **Date of Patent: *Oct. 8, 2013**

(54) INTERCHANGEABLE LIGHTING

(71) Applicant: LSI Industries, Inc., Cincinnati, OH (US)

(72) Inventors: John D. Boyer, Lebanon, OH (US); Brian D. Cranston, Loveland, OH (US); James G. Vanden Eynden, Hamilton, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,654

(22) Filed: Jan. 23, 2013

(65) Prior Publication Data

US 2013/0188352 A1 Jul. 25, 2013

Related U.S. Application Data

(63) Continuation of application No. 12/244,945, filed on Oct. 3, 2008, now Pat. No. 8,382,340.

(51) Int. Cl.

| | |
|---|---|
| ***F21S 8/00*** | (2006.01) |
| ***B60Q 1/00*** | (2006.01) |
| ***B60Q 3/00*** | (2006.01) |
| ***F21S 8/06*** | (2006.01) |

(52) U.S. Cl.

USPC ........... 362/368; 362/147; 362/148; 362/150; 362/404

(58) Field of Classification Search

USPC .......................... 362/368, 147, 148, 150, 404

See application file for complete search history.

(56) References Cited

U.S. PATENT DOCUMENTS

| | | | |
|---|---|---|---|
| 2,144,551 | A | 1/1939 | Skolnick |
| 2,701,840 | A | 2/1955 | Carlson |
| 2,717,955 | A | 9/1955 | McGinty et al. |
| 2,997,575 | A | 8/1961 | Schwartz |
| D209,081 | S | 10/1967 | Netland |
| D212,899 | S | 12/1968 | Vesely et al |
| 3,816,880 | A | 6/1974 | Jacobs |
| 3,883,732 | A | 5/1975 | Peterson et al. |
| D258,919 | S | 4/1981 | Kristofek |
| 4,353,327 | A | 10/1982 | Shroyer |

(Continued)

FOREIGN PATENT DOCUMENTS

| | | |
|---|---|---|
| GB | 2206193 | 12/1988 |
| WO | WO2006/017909 | 2/2006 |

OTHER PUBLICATIONS

International Search Report and the Written Opinion from Corresponding PCT Application No. PCT/US2009/058352 dated Jul. 20, 2010.

(Continued)

*Primary Examiner* — David J Makiya

(74) *Attorney, Agent, or Firm* — McDermott Will & Emery LLP

(57) ABSTRACT

A lighting apparatus is shown and described. In one aspect, the lighting apparatus includes a lighting component and a mounting structure. The lighting component can include a light source, a plate, and a frame. The light source can include one or more lighting elements, such as light emitting diodes. The lighting component can be releasably secured to the mounting structure.

17 Claims, 9 Drawing Sheets

(56) References Cited

U.S. PATENT DOCUMENTS

| | | | |
|---|---|---|---|
| 4,388,677 A | 6/1983 | Druffel | |
| 4,399,497 A | 8/1983 | Druffel | |
| 4,419,717 A | 12/1983 | Price et al. | |
| D272,475 S | 1/1984 | Yahraus | |
| 4,471,416 A | 9/1984 | Druffel | |
| 4,511,113 A | 4/1985 | Druffel | |
| 4,566,057 A | 1/1986 | Druffel | |
| 4,613,929 A | 9/1986 | Totten | |
| 4,745,533 A | 5/1988 | Smerz | |
| 4,794,714 A | 1/1989 | Weisgerber | |
| 4,827,386 A | 5/1989 | Mackiewicz | |
| D308,423 S | 6/1990 | Galipeau et al. | |
| 4,939,858 A | 7/1990 | Dailey | |
| 4,951,045 A | 8/1990 | Knapp et al. | |
| D311,825 S | 11/1990 | Stewart et al. | |
| D329,239 S | 9/1992 | Hahn | |
| 5,161,878 A | 11/1992 | Degelmann et al. | |
| 5,226,719 A | 7/1993 | Feldpausch et al. | |
| D341,358 S | 11/1993 | Stolz et al. | |
| D363,709 S | 10/1995 | Matsumoto | |
| 5,486,983 A | 1/1996 | Cordier | |
| 5,555,654 A | 9/1996 | Hermann | |
| 5,581,448 A | 12/1996 | Harwood | |
| D383,613 S | 9/1997 | Handler | |
| 5,949,581 A | 9/1999 | Kurtenbach et al. | |
| 6,019,487 A | 2/2000 | Fornell | |
| D433,573 S | 11/2000 | Rochon | |
| 6,176,599 B1 | 1/2001 | Farzen | |
| 6,179,451 B1 | 1/2001 | Bodine et al. | |
| D441,223 S | 5/2001 | Reeves et al. | |
| D445,262 S | 7/2001 | Rowan | |
| 6,371,630 B1 | 4/2002 | Unger | |
| 6,375,338 B1 * | 4/2002 | Cummings et al. | 362/276 |
| D456,620 S | 5/2002 | Vincent | |
| D458,238 S | 6/2002 | Niitsu | |
| 6,474,846 B1 * | 11/2002 | Kelmelis et al. | 362/365 |
| 6,536,658 B1 | 3/2003 | Rantze | |
| 6,626,562 B2 | 9/2003 | Blanchard | |
| 6,715,903 B2 * | 4/2004 | Wang | 362/364 |
| 6,899,449 B2 | 5/2005 | Hatagishi et al. | |
| 6,915,762 B2 | 7/2005 | Hsieh et al. | |
| D524,555 S | 7/2006 | Mohundro | |
| 7,146,760 B2 | 12/2006 | Yiu | |
| 7,175,296 B2 * | 2/2007 | Cok | 362/147 |
| D558,382 S | 12/2007 | Cesaro | |
| 7,575,345 B2 | 8/2009 | Gauthier et al. | |
| 7,614,769 B2 * | 11/2009 | Sell | 362/365 |
| 7,699,488 B2 | 4/2010 | Drees | |
| 2010/0110698 A1 | 5/2010 | Harwood et al. | |

OTHER PUBLICATIONS http://www.lsi-industries.com/media/SpecSheets/pdf/sovereign.pdf, LSI Industries, 2 pp (2007).

Examination Report, Mailed Mar. 19, 2010 for Counterpart JP Design Application No. 7757/2009, in Which an Article Entitled "Light Emitting Diode," Published in Dempa Shimbun, dated Apr. 11, 2003.

Response to Office Action dated Apr. 8, 2011 from corresponding Chinese Application No. 2009101786307.

Response to the Written Opinion filed on Nov. 21, 2011 from Corresponding European Application No. 09744821.1.

Response dated May 30, 2012 to Examination Report dated Mar. 27, 2012 from Corresponding New Zealand Patent Application No. 591753.

Response dated Dec. 14, 2012 to Examination Report dated Dec. 7, 2011 from Corresponding Australian Application No. 2009298768.

Response dated Jun. 19, 2013 to Office Action dated Feb. 25, 2013 from Corresponding European Patent Application No. 09744821.1.

Response dated Jan. 21, 2013 to Office Action dated Nov. 8, 2012 from Corresponding Canadian Patent Application No. 2738640.

* cited by examiner

INTERCHANGEABLE LIGHTING

This application is a continuation application of U.S. patent application Ser. No. 12/244,945 filed Oct. 3, 2008, now allowed.

FIELD OF THE DISCLOSURE

The present disclosure relates generally to lighting apparatuses. More specifically, the disclosure relates to various structures for releasably mounted lighting apparatuses facilitating simple installation. The disclosure also relates to various structures for mounted lighting apparatuses facilitating high rates of heat dissipation.

BACKGROUND OF THE DISCLOSURE

Many lighting apparatuses do not permit users to remove, interchange, and installation or replacement in a soffit or ceiling with ease. Specifically, if light distribution, light direction, part replacement, and other motives require the user to remove and re-install the lighting apparatus, a user generally has to suffer through much effort in removing and re-installing the lighting apparatus.

Lighting apparatuses are designed for application in numerous environments. One such circumstance is in soffit or ceiling lighting. Currently, soffit lighting apparatuses are large and bulky. The housing for soffit lighting apparatuses are large because of circuitry, light bulbs, whether incandescent, fluorescent, or the like, reflectors to direct light, and other components.

Heat generation is also a consideration in lighting apparatuses. Excessive heat can diminish the efficiency and lifespan of components within the lighting apparatus.

SUMMARY OF THE DISCLOSURE

In one aspect, the disclosure presents a lighting apparatus that can include a lighting component and a mounting structure. The lighting component can include a frame, a plate, and a light source. The lighting component can further include a first engagement flange. The mounting structure can include a seat, a window, and a second engagement flange.

In one aspect, the disclosure presents a method of installing a lighting apparatus that includes passing a lighting component through a window of a mounting structure and releasably securing the lighting component onto the mounting structure by engaging engagement flanges.

In another aspect, the disclosure presents a method of disengaging a lighting component from a mounting structure that includes disengaging engagement flanges and lifting the lighting component.

In one embodiment, the engagement flanges comprise a tab and a tab insert window. Further, the engagement flanges can comprise a clip and a lip.

In various embodiments, the light source includes lighting elements. A lighting element can be a light emitting diode ("LED"). The light source can then include a printed circuit board ("PCB") on which or in which LEDs can be mounted or created.

In one embodiment, the plate, frame, first engagement flange, and second engagement flange are constructed of sheet metal. In another embodiment, the lighting apparatus includes a lens that covers at least a portion of the light source.

DETAILED DESCRIPTION OF THE DISCLOSURE

Figure 1:
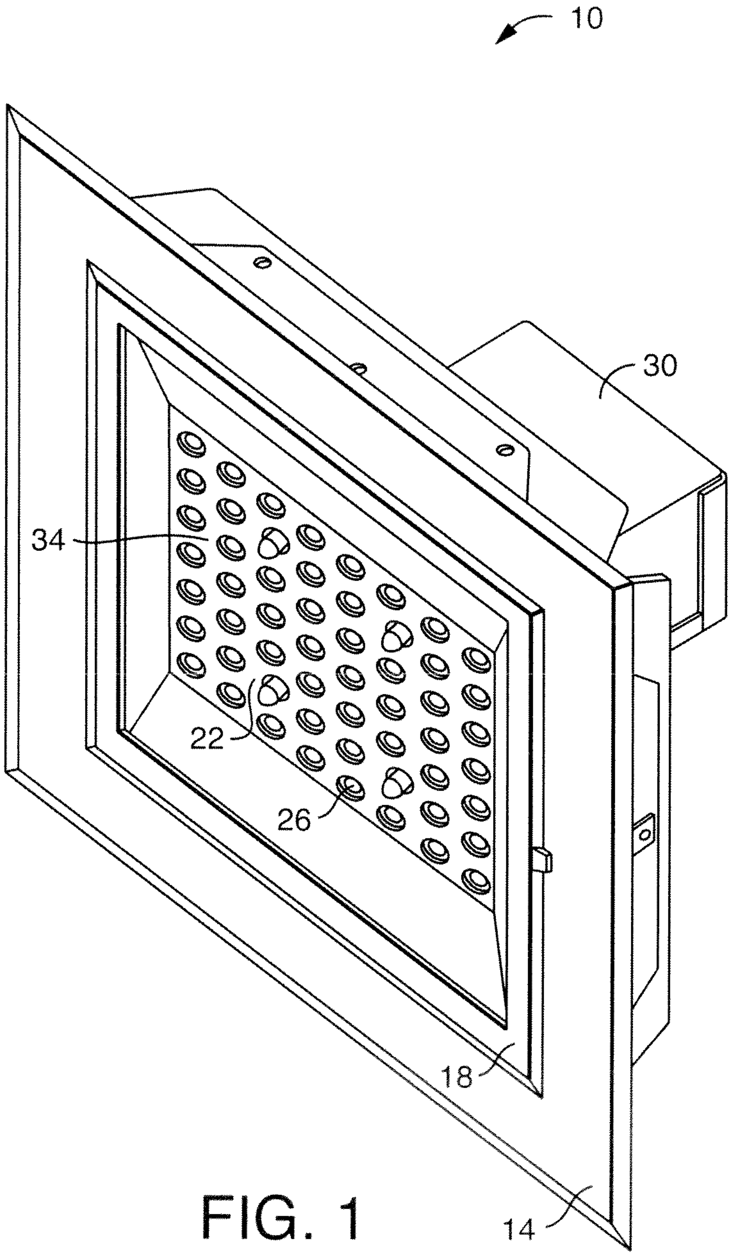
FIG. 1 shows a perspective view of an embodiment of a lighting apparatus.

The present disclosure illustrates an embodiment of an interchangeable lighting apparatus. More specifically, the apparatus is comprised of a lighting component and a mounting structure. One application for such an apparatus is soffit or ceiling lighting. The disclosure shows and describes a lighting apparatus which permits a user to easily remove, interchange, and install a lighting component.

One embodiment of a lighting apparatus 10 in accord with the present disclosure is shown FIGS. 1-4. The lighting apparatus 10 is comprised of a mounting structure 14 and a lighting component 58. The lighting component includes, but is not limited to, a frame 18, a light source 22 containing a plurality of lighting elements 26, a housing 30, and a lens 34. Each of the mounting structure 14, the lighting component 58, and their interaction is discussed below in greater detail.

Referring to FIG. 1, the plane defined by the lens 34 and mounting structure 14 is roughly the same plane as a ceiling or soffit in which the lighting apparatus 10 is installed. Accordingly, the lighting apparatus 10, once installed, is substantially flush with the associated ceiling or soffit. The present disclosure contemplates, however, an installed lighting apparatus 10 which is not substantially flush with surrounding environments.

Figure 2:
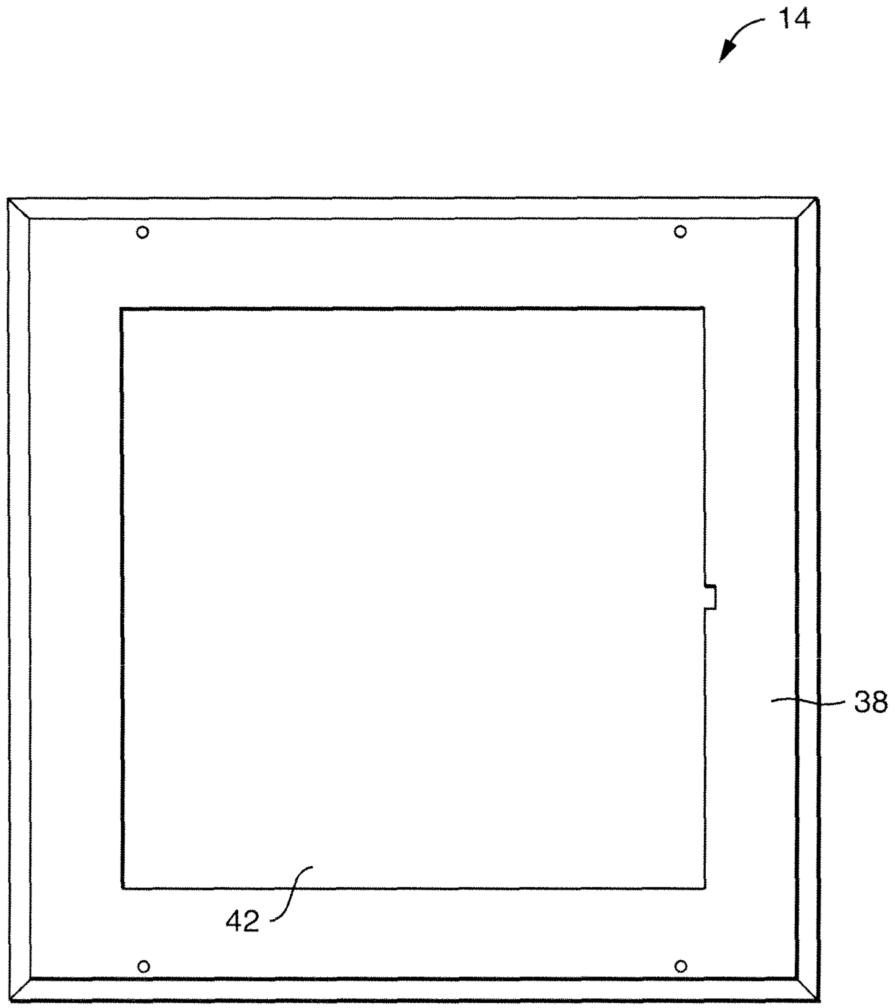
FIG. 2 shows a bottom view of a mounting structure of the lighting apparatus of FIG. 1.
Figure 3:
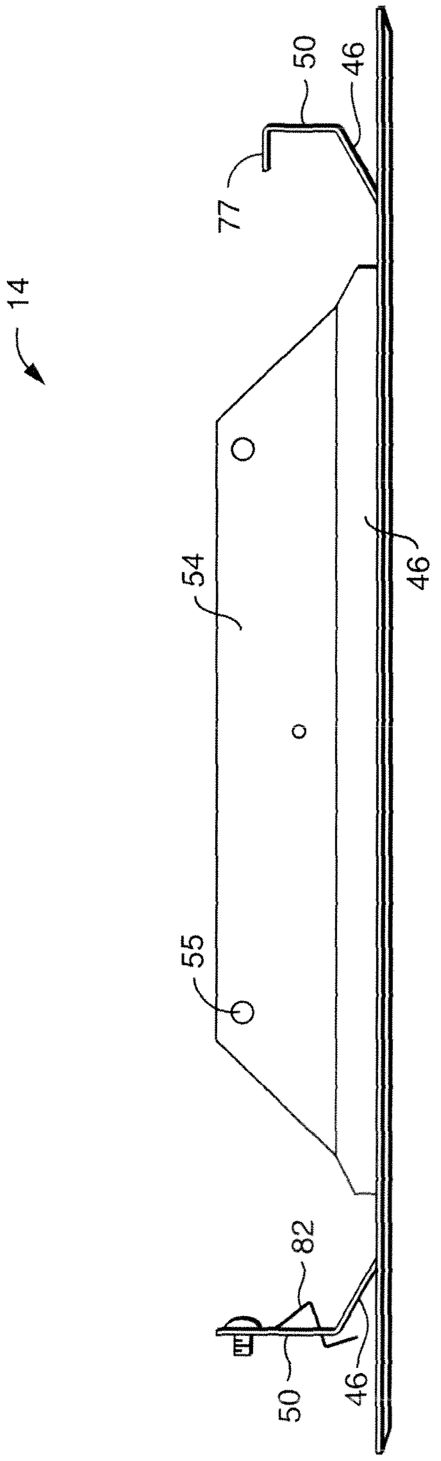
FIG. 3 shows a side view of the mounting structure of FIG. 2.

Referring now to FIGS. 2 and 3, a mounting structure 14 is shown and described. The mounting structure 14 has a flat surface 38 which, when installed in a ceiling or soffit, is substantially flush with a surrounding soffit or ceiling surface. Flat surface 38 defines a window 42.

Extending from the mounting structure are four upwardly oriented extensions each comprising a seat 46. Two opposing upwardly oriented extensions comprise engagement flanges 50 and the other two comprise installation flanges 54. Any number of upwardly oriented extensions can be employed depending on the shape of the mounting structure 14 and lighting component 58. As shown, the seat 46 is angled extending from the each edge of the window 42. The engagement flanges 50 and installation flanges 54 extend from their associated seats 46. The engagement flanges 50 are configured to releasable secure the lighting component 58 to the mounting structure 14, as described below in further detail. In the depicted embodiment, this is accomplished with a clip 82 attached to one engagement flange 50 and one or more tabs 77 extending inward from the other engagement flange 50. The installation flanges 54 facilitate fastening of the mounting structure 14 to an associated soffit or ceiling structure (not depicted). For example, the mounting structure 14 could be secured to studs in the soffit or ceiling by nails, screws, or other fastening mechanisms through holes 55 in the installation flanges 54. This disclosure also contemplates combining the structure and function of the an installation flanges 54 and an engagement flanges 50 into a single pair of flanges.

Figure 4:
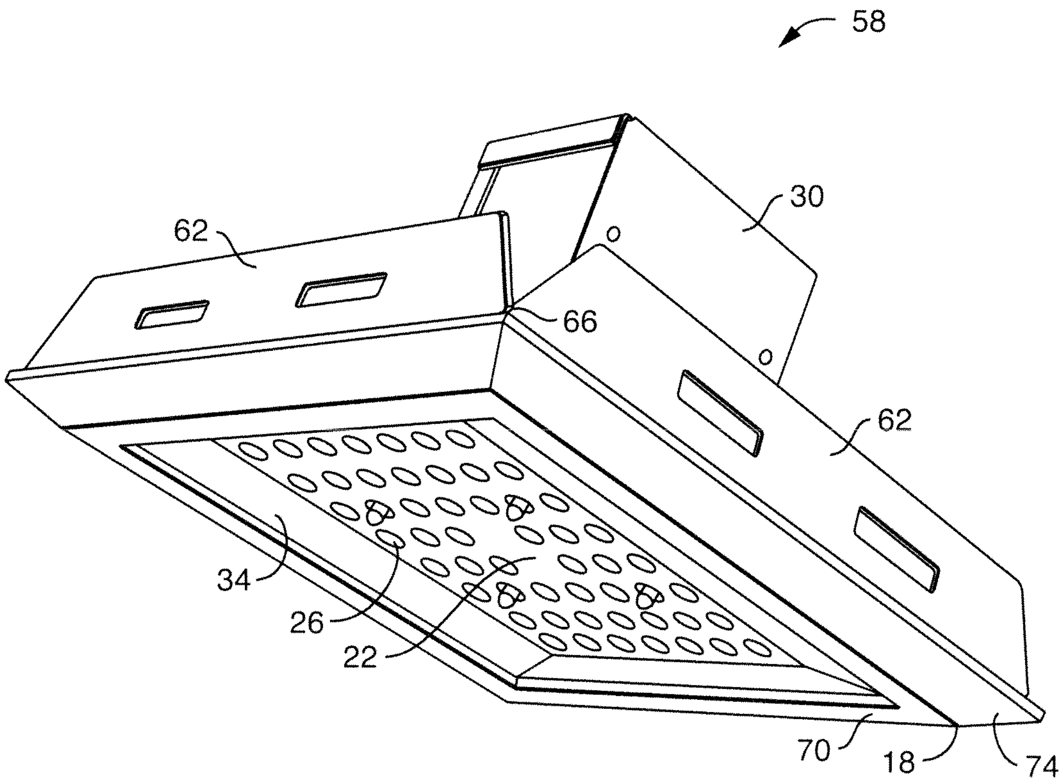
FIG. 4 shows a perspective view of a lighting component of the lighting apparatus of FIG. 1.

Referring now to FIG. 4, one embodiment of the lighting component 58 is shown and described. The lighting component 58 is comprised of the frame 18, the light source 22 containing the plurality of lighting elements 26, the housing 30, the lens 34, engagement flanges 62, and a plate 66 mounted to the back of the frame 18. In one embodiment, the lighting elements 26 are light emitting diodes (LEDs), such as a Nichia NS6W083 or a OSRAM LUW W5AM. These LEDs can be mounted on or formed in a PCB. The driver circuitry, power regulators, and other electronic components are enclosed in the housing 30. Distribution of light from the lighting elements 26 can be, although is not necessarily, managed by one or more refracting lenses and/or reflectors. Copending U.S. patent application Ser. No. 12/166,536, filed Jul. 2, 2008, incorporated herein by reference in its entirety, discloses one possible reflector system that may be used with the apparatus 10 of the present disclosure.

The frame 18 of the depicted embodiment has a flat surface 70 and an angled surface 74. In such an embodiment, the frame 18, including flat surface 70 and sloped surface 74, the lens 34, and the plate 66 substantially enclose the light source. Alternatively, the plate 66 may be coupled to the light source 22. In communication with the plate 66 are the engagement flanges 62. As shown, the engagement flanges 62 have tab insert windows, but can have other various engagement mechanisms. Four engagement flanges 62 are depicted in the figures, one on each side of the square-shaped lighting component. However, only two are necessary in the square-shaped embodiment depicted to accomplish the described functionality. The remaining two engagement flanges 62 are present to provide complete symmetry, easing installation. It is contemplated that the number and extent of the engagement flanges 62 will vary depending on the shape of the perimeter of the lighting component 58.

Figure 5:
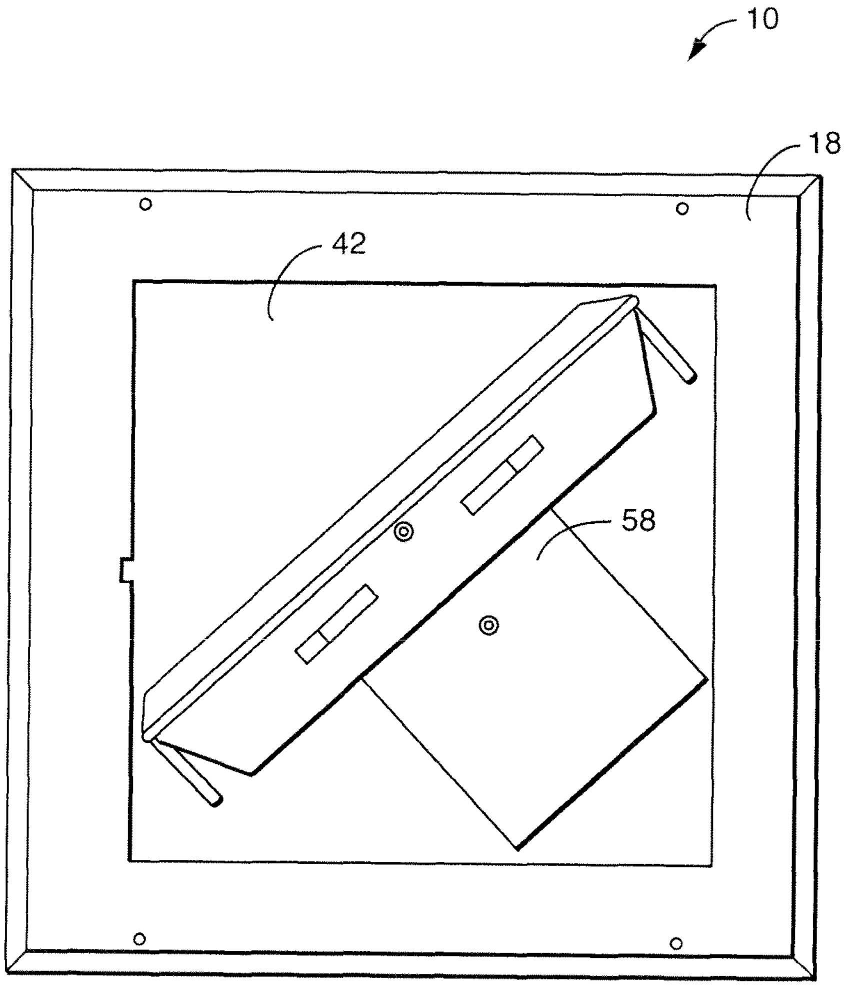
FIG. 5 illustrates a first step in one installation process of the lighting apparatus of FIG. 1.

Referring now to FIG. 5, the window 42 is preferably configured to be of sufficient size to allow the lighting component 58 to fully pass through the window 42. With this configuration, the lighting component 58 can be installed into a mounting structure 14 mounted in its intended environment by passing the lighting component 58 through the window 42 and then lowering the lighting component 58 onto the mounting structure 14.

Figure 6:
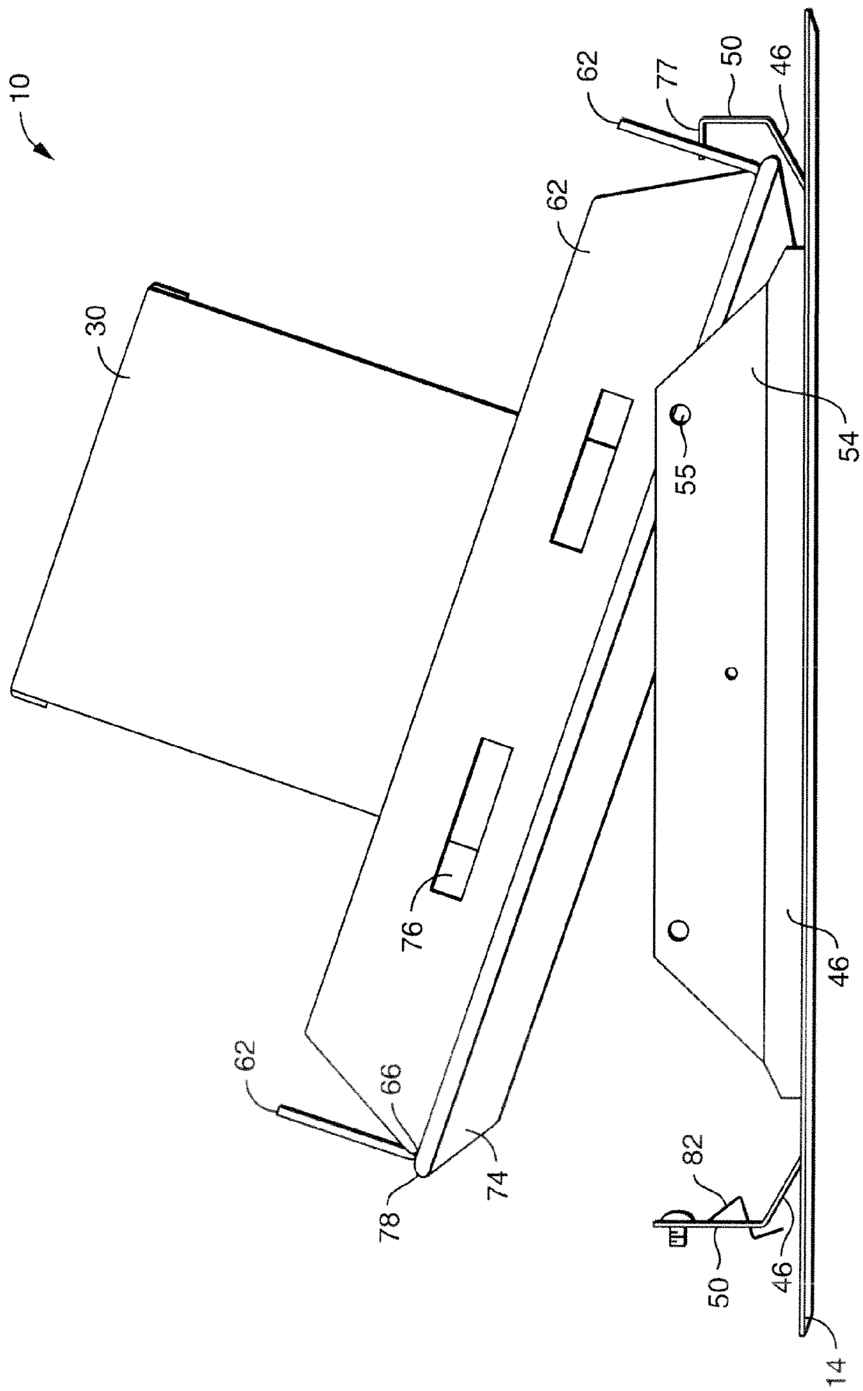
FIG. 6 shows another step in an installation process of the lighting apparatus of FIG. 1.
Figure 7:
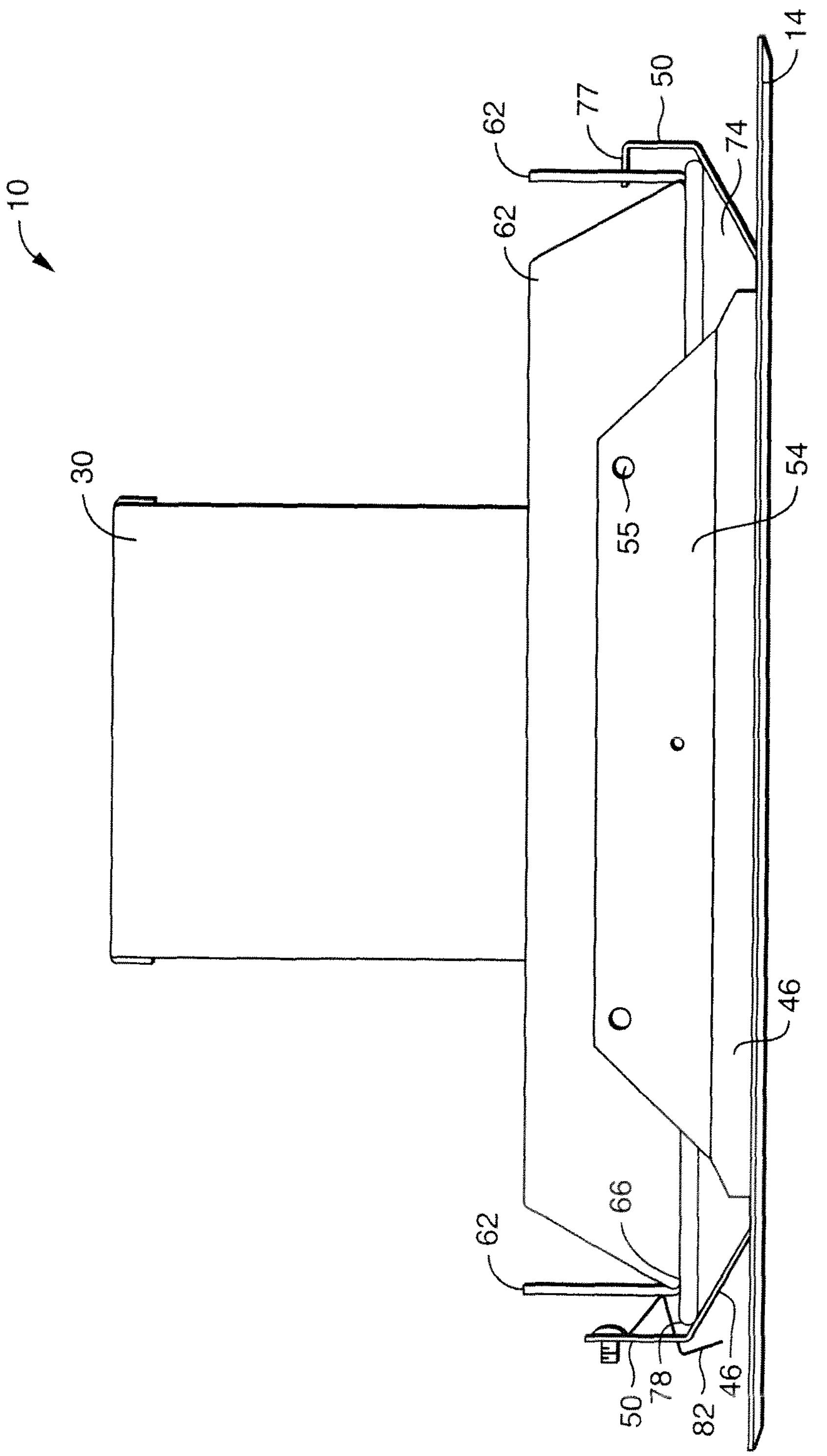
FIG. 7 shows a side view of an embodiment of the lighting apparatus of FIG. 1 after the installation process has been completed.
Figure 8:
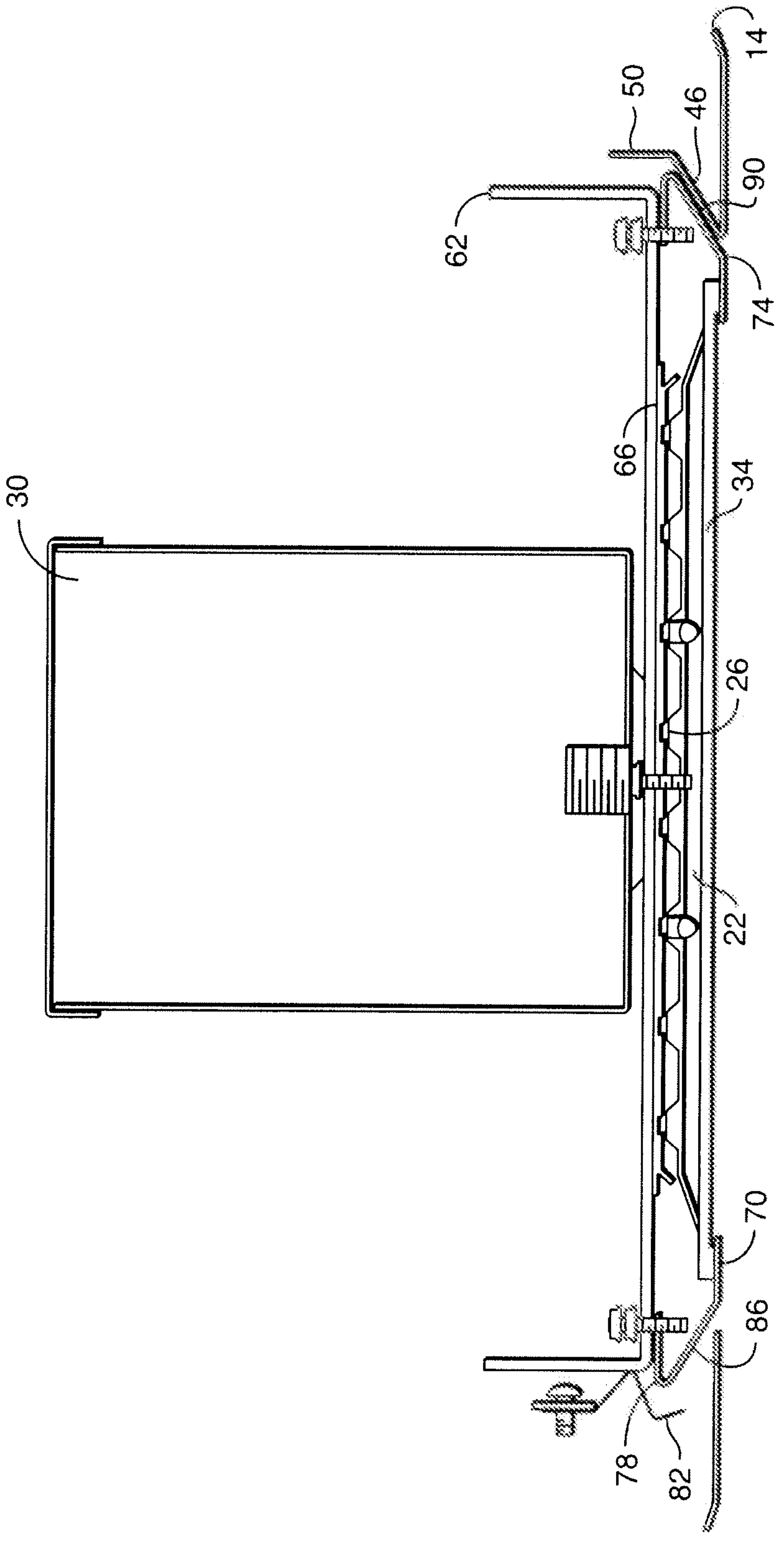
FIG. 8 shows a cross-sectional view of the lighting apparatus of FIG. 1.

More specifically, in one embodiment, with reference to FIGS. 6, 7, and 8, once the lighting component 58 passes through the window 42, it is rotated such that one engagement flange 62 is aligned with one mounting structure engagement flange 50. As shown, the tab insert window 76 on frame engagement flange 62 is aligned with the tab 77 on mounting structure engagement flange 50. Further, because the tab insert window 76 appears on all frame engagement flanges 62, the lighting component 58 can be installed using any of the frame engagement flanges 62. As alternatively contemplated in this disclosure, the engagement mechanisms and location of such mechanisms on the mounting structure 14 and lighting component 58 can vary.

Once the tab 77 is inserted into the tab insert window 76, the lighting component 58 is lowered such that a lip 78 pushes past the clip 82 on the mounting structure engagement flange 50. Once the lip 78 clears the clip 82, the lighting component 58 is releasably secured into a seated position on the mounting structure 14. The lip 78 can be defined as the outermost perimeter created by coupling the plate 66 to the frame 18, where the outer perimeter of the plate 66 is smaller than the outer perimeter of the frame 18.

Figure 9:
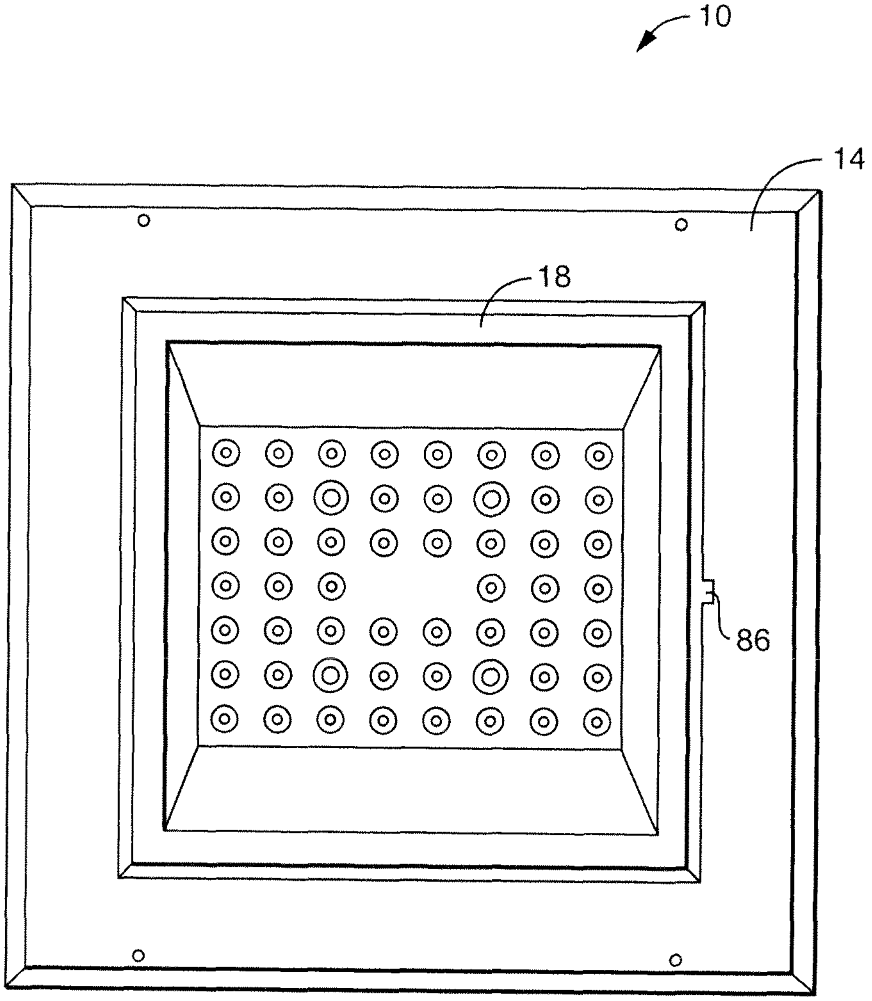
FIG. 9 shows a bottom view of the lighting apparatus of FIG. 1.

Referring now to FIG. 9, an installed lighting apparatus 10 is shown and described. The mounting structure flat surface 38 and frame flat surface 70 define a roughly flat plane. Alternatively, the present disclosure contemplates a lighting apparatus 10, or any part therein, that is not co-planar with other components are surrounding environments. To remove the lighting component 58 from the mounting structure 14, a user may use a straight object and push it through access hole 86. This access hole 86 is configured to receive a straight object and is in-line with the clip 82; the straight object will push the clip 82, allowing the lighting component 58 to be lifted, because the lip 78 will have clearance to pass the clip 82. With this access hole 86, the lighting component 58 can be installed in a mounting structure 14 secured to a soffit or ceiling and removed without any formal tools, such as a screw driver, drill, hammer, or other similar dedicated device. For example, a common pen or pencil can be used to push the clip 82 via the access hole 86 for removal of the lighting component 58. Thus, this configuration permits a user to easily remove lighting components 58 to replace parts, change light distribution, adjust lighting direction, or other purpose.

The embodiment disclosed in FIGS. 1-9 permits thermal communication between the frame 18 and the mounting structure 14 along the contact therebetween, such as at contact point 90, shown in FIG. 8. In one embodiment, the lighting elements 26 are LEDs mounted on or created in a PCB. In such a configuration, the LEDs and/or PCB generate heat which can be dissipated to increase lifespan and efficiency of the LEDs, circuitry, and other parts of the lighting apparatus 10. Via the plate 66, heat is conducted from the PCB and/or LEDs to the frame 18, including direct contact or, where necessary, indirect contact, such as through a gasket, adhesive, or polyurethane. Heat is then conducted from the frame 18 to the mounting structure 14 through thermal communication between the angled surface of the frame 18 and the seat 46 through gravitational pull and, optionally, additional force applied by the clip 82 and tabs 77. By placing the two elements in thermal communication, heat generated in the frame 18 is conducted to the mounting structure 14. Because the mounting structure 14 has a flat surface 38 that is exposed to air outside the lighting apparatus 10, the mounting structure 14 aids heat dissipation through radiation and convection of heat. Heat is also transferred to the mounting structure engagement flanges 50 and installation flanges 54 via the plate 66. These flanges 50, 54 further aid heat dissipation away from the lighting elements 26. This process is further described in co-pending U.S. patent application Ser. No. 12/236,243, filed Sep. 23, 2008, incorporated herein by reference in its entirety.

In a further effort to maintain cooler temperatures of the circuitry, the driver, power regulator, and other circuit components enclosed in the housing 30 are located away from the PCB. For this reason, the housing 30 is designed have the largest height possible, while still permitting the lighting component 58 to fit through the window 42. In an alternate embodiment, the housing can be shorter to decrease the depth of the lighting component 58. Such decrease would allow use of the lighting apparatus 10 in environments where the clearance for the soffit or ceiling light is low.

In an alternate embodiment, a handle and a force lock, not shown, can be used to tightly secure the frame 18 to the mounting structure 14. In such a configuration, not only would the frame be more rigidly fixed into place, but thermal communication is increased because of the forcibly increased surface contact between the frame 18 and the mounting structure 14. Further, any locking mechanism, such as, but not limited to, levers, switches, clamps, or other mechanism may be used to attach the frame 18 to the mounting structure 14. Conversely, the present disclosure contemplates a lighting apparatus 10 without a clip 82, tab 77, or other mechanism, where gravity alone releasably secures the lighting component 58 to the mounting structure 14.

The present disclosure also contemplates the mounting structure engagement flanges 50 and frame engagement flanges 62 having any type of attaching, locking, or engagement mechanism. For example, engagement flanges 50, 62 can comprise, but are not limited to comprising, clips, tabs, screws, clamps, nails, or other engagement mechanism.

In alternative embodiments, components of lighting apparatus 58 can have non-flat surfaces. One benefit of having a non-flat surface is to increase surface area to aid in heat dissipation. For example, the mounting structure 14 can be dimpled, rippled, wavy, painted, or otherwise textured. Moreover, components of the lighting apparatus 58 can be constructed of any material. For example, one or more of the components in the lighting apparatus 10 can be constructed of sheet metal, such as ASTM: Aluminum 3003 H14. In alternative embodiments, the material used can be, but is not limited to, silver, bronze, plastic, or other material.

Moreover, the different components can be contiguous. For example, the plate 66 and one or more frame engagement flanges 62 can be one piece. Another example is that the mounting structure 18 is contiguous with the mounting structure installation 54 and/or engagement flanges 50. Conversely, any two components can be in communication but not in direct contact. For example, a gasket can be inserted between the seat 46 and the sloped surface 74 of the frame 18. In an alternate embodiment, the components can be releasably connected. For example, the plate 66 can be fastened to the frame 18 with a screw.

In alternate embodiments, the parts of the lighting apparatus 10 can take various shape. For example, the window 42 defined by the edges of the mounting structure 14 can be, but is not limited to being, circular, oval, rectangular, triangular, or other shape. Similarly, the engagement flanges 50, 62; installation flanges 54; mounting structure 14; or other part of the lighting apparatus 10 can take various shape. Thus, the different parts of the lighting apparatus 10 can take various forms, as one skilled in the art appreciates.

This disclosure alternately contemplates that lighting apparatus 10 can be configured for different environments and applications. For example, the installation flanges 54 can be used to hang the lighting apparatus 10. Conversely, the installation flanges 54 may be used to affix the mounting structure 14 to a side wall or floor. As such, the present disclosure contemplates soffit lighting, ceiling lighting, hanging lighting, floor lighting, or other type of lighting application.

The present disclosure contemplates the use of various lighting elements 26. Possible lighting elements 26 include, but are not limited to, incandescent light bulbs, fluorescent lights, LEDs, organic LEDs (OLEDs), and other commercially or non-commercially available light emanating components.

While the disclosure makes reference to the details of specific embodiments, the disclosure is intended to be illustrative rather than limiting. Modifications will readily occur to those skilled in the art, within the spirit of this disclosure. Further, the examples provided herein are intended to illustrate sample embodiments contemplated in the present disclosure and are not exhaustive in nature.

We claim:

1. A lighting apparatus comprising:

a light source comprising one or more lighting elements;

a frame at least partially enclosing the light source, the frame defining an angled surface;

a mounting structure with a window of sufficient size to permit the frame to pass through the window; and a seat configured to hold the light source and the frame, the seat in communication with the mounting structure and extending upwardly and outwardly at an angle to the window, wherein the angled surface of the frame is configured to rest on the seat of the mounting structure.

2. The lighting apparatus of claim 1, further comprising a first engagement flange in communication with the frame, the first engagement flange comprising a tab insert window.

3. The lighting apparatus of claim 2 further comprising a second engagement flange in communication with the seat, where the second engagement flange comprises a tab configured to engage the tab insert window of the first engagement flange such that the frame may be rotated about the tab.

4. The lighting apparatus of claim 3 where two or more of the frame, first engagement flange, mounting structure, seat, second engagement flange, or housing are contiguous.

5. The lighting apparatus of claim 1, wherein at least portions of the angled surface and the seat are in contact providing an area of surface contact less than the surface of the mounting structure exposed to free flowing air.

6. The lighting apparatus of claim 1 where the one or more lighting elements comprise a light emitting diode.

7. The lighting apparatus of claim 3 where the first engagement flange is configured to create a lip which is an extension of the frame.

8. The lighting apparatus of claim 7 where the second engagement flange comprises a clip, the clip being configured to releasably secure the lip.

9. The lighting apparatus of claim 1 further comprising a lens substantially enclosing the light source.

10. The lighting apparatus of claim 1 further comprising a plate in communication with at least one of the light source or the frame.

11. The lighting apparatus of claim 1 further comprising a housing enclosing light source operating components.

12. A lighting component comprising:

a light source comprising one or more lighting elements;

a frame at least partially enclosing the light source and having an angled surface configured to rest on a seat of a mounting structure wherein the mounting structure comprises a window of sufficient size to permit the frame to pass through the window and the seat extends upwardly and outwardly at an angle to the window configured to receive the angled surface of the frame; and a lens in communication with the frame and substantially enclosing the light source.

13. The lighting component of claim 12 further comprising an engagement flange in communication with the frame, the engagement flange comprising a tab insert window.

14. The lighting component of claim 12 further comprising a housing enclosing light source operating components.

15. The lighting component of claim 14, the housing comprising a tab configured to engage a tab insert window to allow the frame to be rotated about the tab.

16. The lighting component of claim 12 where the one or more lighting elements comprise a light emitting diode.

17. The lighting component of claim 12 further comprising a plate in communication with the frame.

* * * * *